June 5, 1945. H. S. JANDUS 2,377,691
BRAKE LEVER CONTROL
Filed Nov. 13, 1944
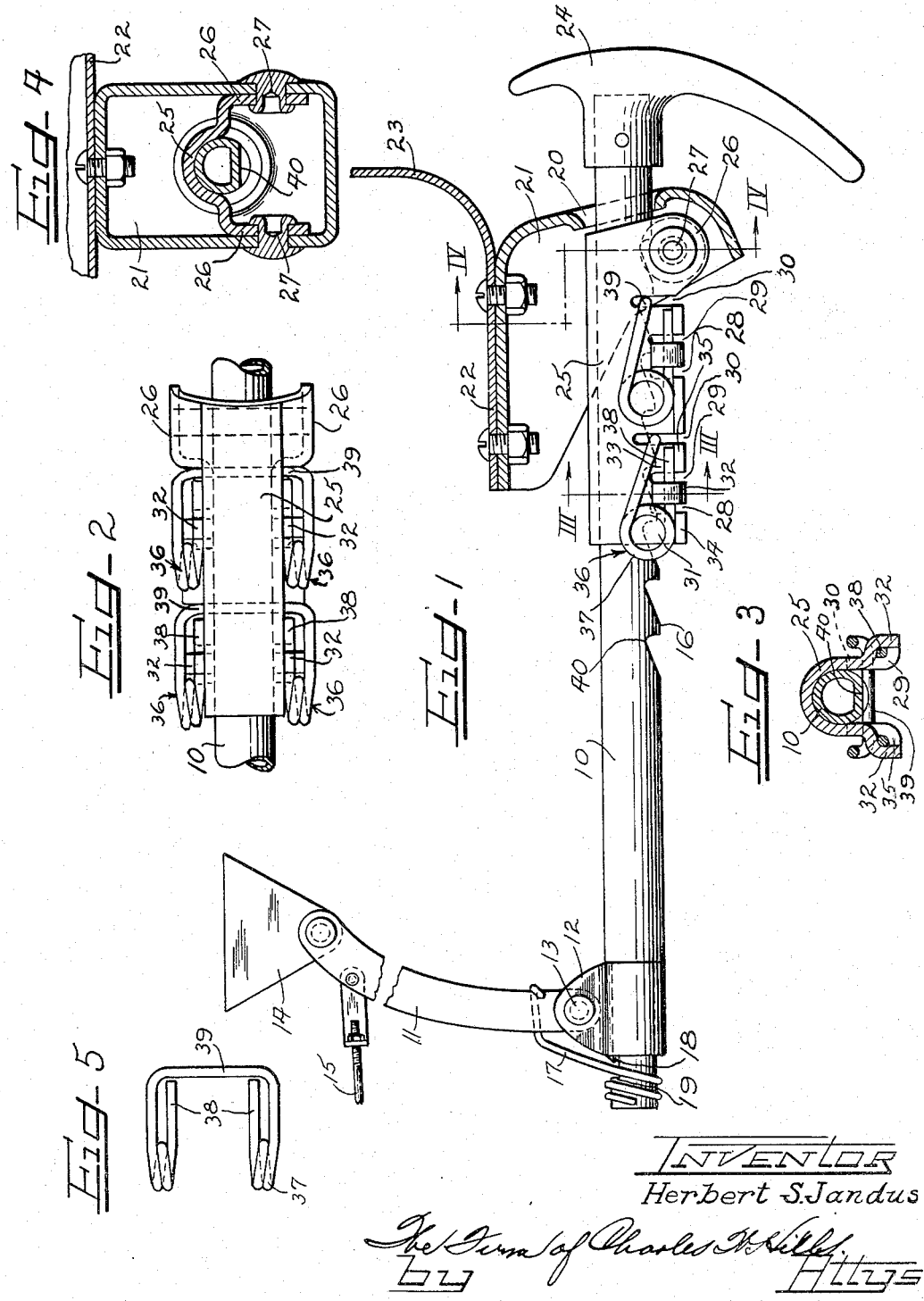
Inventor
Herbert S. Jandus Patented June 5, 1945

2,377,691

UNITED STATES PATENT OFFICE 2,377,691

BRAKE LEVER CONTROL

Herbert S. Jandus, Detroit, Mich., assignor to Houdaille-Hershey Corporation, Detroit, Mich., a corporation of Michigan Application November 13, 1944, Serial No. 563,258

13 Claims. (Cl. 74—541)

My invention relates to the straight pull type of brake levers such, for example, as disclosed in my Patent No. 2,295,792, issued September 15, 1942, my present invention concerning particularly improved and simplified ratchet control structure for the pull rod.

An important object of the invention is to provide a simplified ratchet connection between the pull shaft or rod and a support embodying a guide frame on the support through which the toothed rod extends and on which frame pawl units in the form of springs are anchored for detent engagement with the rod teeth.

A further object is to provide spring pawl units on the guide frame which will function to hold the rod aligned within the guide frame, and at the same time will function as detents for co-operation with the teeth on the rod.

Another object is to provide a guide frame for the rod which may be stamped integral from sheet metal into U form, with U-shaped spring pawl units anchored at their ends on the guide frame and engaging with their yokes against the rod to hold it within the guide frame and also to function as detents for co-operation with the rod teeth.

The above referred to and other features of my invention are embodied in the structure shown on the drawing, in which:

Figure 1 is a side elevation of the pull rod connected with a brake lever and showing my improved ratchet connection between the pull rod and a supporting bracket on the instrument panel of the vehicle;

Figure 2 is a plan view of the rod and the guide frame with the spring pawl assembly thereon;

Figure 3 is a section on plane III—III Figure 1;

Figure 4 is a section on plane IV—IV Figure 1; and

Figure 5 is a plan view of one of the spring pawl units.

The rod 10 is cylindrical and may be either of solid stock or of tubular construction. At its rear end the rod may be connected with a brake lever in the same manner as disclosed in my Patent No. 2,295,792. Briefly, the reduced end of the rod extends through and is journaled in the bracket 12 pivoted by the pin 13 to the end of the brake lever which at its upper end is fulcrumed on a suitable support 14 and has extending therefrom a rod or cable 15 for connection with the brake to be controlled. The rod has ratchet teeth 16, preferably on its underside, and the spring 17 between the end of the rod and the end of the brake lever tends to hold the rod in normal position with the teeth down. An abutment 18 on the bracket 12 co-operates with the flat face 19 in the end of the rod to limit the rotational movement of the rod, all in the manner disclosed in my patent referred to.

The pull rod 10 extends at its outer end through the opening 20 in the front wall of a bracket 21 which may be secured against the under side of the lip 22 on the instrument panel 23 in the vehicle. A suitable handle or grip 24 is provided for the outer end of the rod whereby it may be readily moved axially and also rotated.

The supporting and guide frame 25 for the pull rod is of U cross section, the frame straddling the rod and its bend or yoke part being of semicircular curvature to receive the rod, as shown on Figure 3. At the outer end of the frame the side walls or legs 26 of the frame are spaced apart to form ears which fit between the side walls of the bracket 21 to which they are fulcrumed as by rivets 27, the frame 25 being thus vertically swingable to follow any vertical swing of the pull rod during brake control thereby. Rearwardly of its pivot connection with the frame 21, the side walls of the frame are provided with sets of transverse slots, each set comprising the slots 28, 29 and 30, to leave tongues 31, 32 and 33. The tongues 31 and 33 are deflected laterally outwardly at their ends to provide seats 34 and 35 for spring pawl units 36. These pawl units are of U shape, the leg portions thereof being bent into one or more turns or coils 37 and with the ends 38 extended back toward the yoke portion 39. The spring units straddle the frame 25 with their feet 38 engaging the seat ends 34 and 35 of the tongues 31 and 33, the yoke portion 39 of each spring unit engaging in the slots 30 to extend across and against the bottom of the pull rod and in the path of the teeth 16, the springs being normally sufficiently spread so that when contracted into service position, the yokes will exert upward pressure against the rod. In order to hold these spring ends or feet 38 securely in place, the tongues 32 are deflected outwardly and then downwardly against the feet 38 to thus securely hold the spring units in service position. As shown, two sets of slots and two pawl units are provided on the guide frame 25, the slot sets being so spaced that while the yoke portion of one of the pawls engages with the rod at the base of one of the teeth, the yoke portion of the other pawl will engage with a tooth at some intermediate point, thus giving the effect of a double ratchet.

The teeth are formed in the push rod by transverse notching of the rod so as to leave the flat cross surfaces 40 at the bases of the teeth. The pressure of the yoke portions of the spring pawls against these flat surfaces will tend to hold the rod properly aligned in the frame 25 with the teeth thereon at the bottom. Figure 1 shows the push rod in its normal position with the brake released. When it is desired to set the brake, the rod is pulled out and the spring pawls will click along the teeth, and when the rod grip is released, the yoke of the spring pawl nearest a tooth will be engaged by the tooth to thus lock the rod in its brake setting position. If it is desired to release the brake, the grip 24 is turned for sufficient rotation of the rod to bring the cylindrical surface of the rod at one side of the teeth into engagement with the yoke portions of the spring pawls to release the detent connection of the pawls with the rod and permit the rod to be moved back into normal brake releasing position. The grip is then released and the spring 17 will then rotate the rod back to its normal position for engagement of the spring pawls with the teeth.

Besides functioning for detent co-operation with the ratchet teeth on the pull rod, the spring pawls will function to hold the rod securely seated in the yoke portion of the frame.

My improved ratchet assembly is of simple construction and can be economically produced. The supporting bracket 21 and the guide frame 25 can each be formed integral of sheet metal and the pawls can be readily bent from stock steel wire and can be readily assembled on the frame 25 for holding the push rod therein and for detent co-operation with the rod teeth.

I have shown a practical and efficient embodiment of the features of my invention but I do not desire to be limited to the exact construction and arrangement shown and described, as changes and modifications may be made which would still come within the scope of the invention as defined in the appended claims.

I claim as my invention:

1. A ratchet control for the toothed pull rod of a brake setting assembly, comprising a supporting bracket for the outer end of the rod, a guide frame on said bracket of U cross section receiving the rod in its bend, the side walls of said frame being transversely slotted inwardly from their edges to provide tongues, said tongues being deflected outwardly at their ends to provide seats, a pawl unit in the form of a wire spring of U shape with the ends of its leg portions bent back toward the yoke portion to form feet, said pawl straddling said frame to rest with its feet against the seat ends of said tongues and with the yoke portion of the pawl extending into two opposite slots for pressure engagement against the toothed side of said rod for detent co-operation with the teeth to lock the rod against inward movement in said frame after outward brake setting movement thereof.

2. A ratchet control for the toothed pull rod of a brake setting assembly, comprising a supporting bracket for the outer end of the rod, a guide frame on said bracket of U cross section receiving the rod in its bend, the side walls of said frame being transversely slotted inwardly from their edges to provide tongues, said tongues being deflected outwardly at their ends to provide seats, a pawl unit in the form of a wire spring of U shape with the ends of its leg portions bent back toward the yoke portion to form feet, said pawl straddling said frame to rest with its feet against the seat ends of said tongues and with the yoke portion of the pawl extending into two opposite slots for pressure engagement against the toothed side of said rod for detent co-operation with the teeth to lock the rod against inward movement in said frame after outward brake setting movement thereof, the pressure of the yoke portion of said pawl functioning also to hold the rod in the bend of said frame.

3. Control means for the ratchet pull rod of a brake setting assembly, comprising a U frame receiving the rod in its bend with the teeth on the rod exposed to the open side of the frame, the side walls of said frame being deflected outwardly at their ends to form seats, a detent pawl of spring wire bent to U shape with the outer portions of its legs bent down and backwardly to extend below the inner portions of the legs to form feet, said pawl straddling said frame with its feet engaging the seats at the opposite sides of the frame, the side walls of said frame having opposite slots into which the yoke portion of the pawl extends for pressure engagement with the rod and detent co-operation with the teeth thereon to lock said rod in brake setting position after pulling out thereof, said rod being rotatable in said frame whereby to move the teeth away from the pawl yoke portion and to bring a smooth continuous surface of the rod into engagement with the yoke portion whereby said rod will be released from the pawl for rearward axial movement in said frame for brake release.

4. A ratchet control for the ratchet pull rod of a brake setting assembly, comprising a guide frame through which the outer end of the rod extends, abutments on the opposite sides of said frame, a spring wire detent pawl of U shape with the outer portions of the legs thereof bent back below the inner portions of the legs, said pawl straddling said frame with said outer portions of the legs seating on said abutments, a transverse slot in said frame into which the yoke portion of the pawl extends for pressure detent engagement with the teeth of the rod for locking the rod in its outwardly shifted brake setting position, and means whereby rotation of said rod will effect release of the pawl from the teeth to permit back shift of the rod for brake release.

5. A control for the ratchet pull bar of a brake setting assembly, comprising a guide frame through which the rod extends, clamping tongues on opposite sides of said frame, a spring wire pawl of U shape having the ends of its legs clamped to the sides of said frame by the respective clamping tongues, said frame being transversely slotted for receiving the yoke portion of said pawl for pressure detent engagement with the teeth of the ratchet rod for locking the rod in its brake setting position.

6. A control for the ratchet pull bar of a brake setting assembly, comprising a guide frame through which the rod extends, clamping tongues on opposite sides of said frame, a spring wire pawl of U shape having the ends of its legs clamped to the sides of said frame by the respective clamping tongues, said frame being transversely slotted for receiving the yoke portion of said pawl for pressure detent engagement with the teeth of the ratchet rod for locking the rod in its brake setting position, said rod being cylindrical with its teeth normally exposed to said pawl, and said rod being rotatable in said frame for moving the teeth away from the pawl yoke and presenting a smooth surface thereto for permitting the rod to be shifted back for brake release.

7. A control for the ratchet pull rod of a brake setting assembly, comprising a supporting and guide frame through which the outer end of the rod extends, a pair of seating tongues on opposite sides of said frame, a spring wire pawl of U shape, said pawl straddling said frame with the ends of its legs resting on said seat tongues, clamping tongues on said frame intermediate the seat tongues for cooperating with said seat tongues to clamp said pawl ends securely to said frame, said frame being transversely slotted for receiving the yoke portion of said pawl for pressure detent engagement with the teeth of the rod for locking the rod in its axially shifted brake setting position.

8. A control for the ratchet pull rod of a brake setting assembly, comprising a supporting and guide frame through which the outer end of the rod extends, a pair of seating tongues on opposite sides of said frame, a spring wire pawl of U shape, said pawl straddling said frame with the ends of its legs resting on said seat tongues, clamping tongues on said frame intermediate the seat tongues for co-operating with said seat tongues to clamp said pawl ends securely to said frame, said frame being transversely slotted for receiving the yoke portion of said pawl for pressure detent engagement with the teeth of the rod for locking the rod in its axially shifted brake setting position, said rod being cylindrical with the teeth extending along a longitudinal line thereon whereby when said rod is rotated through an arc the cylindrical surface adjacent the teeth will engage with the yoke portion of said pawl to cam it away from the teeth whereby said rod may then be shifted axially back into brake release position.

9. A control for a brake lever having a cylindrical pull rod extending therefrom, comprising a U frame receiving the rod in its bend and having a pair of seat tongues extending outwardly on opposite sides thereof, a spring wire pawl of U shape whose legs intermediate their ends are bent to form spring coils and to bring the end portions of the legs forwardly below the inner portions thereof, said end portions of the legs seating at opposite sides of said body on said seat tongues, clamping tongues intermediate said seat tongues for co-operating with said seat tongues to clamp said end portions to the body, opposite slots in the side walls of said frame into which the yoke portion of the pawl extends for pressure detent engagement with the teeth on said rod for locking said rod in shifted brake setting position, said pawl by its pressure engagement with said rod holding it in the bend of said frame, turning of said rod through a small arc when in its brake setting position bringing the cylindrical surface of the rod adjacent the tooth line into camming engagement with the pawl yoke portion to release it from the teeth whereby said rod may then be shifted back in said frame for brake release.

10. A control for the ratchet pull rod of a brake setting assembly, comprising a supporting bracket for mounting on the instrument panel of a vehicle and having an opening through which the outer end of the rod extends, a guide frame receiving said rod and fulcrumed at its outer end on said bracket for vertical swing with the rod, clamping tongues on opposite sides of said frame, a spring wire pawl of U shape having the ends of its legs secured to said body at opposite sides thereof by said clamping tongues, said body being transversely slotted for receiving the yoke portion of said pawl for pressure detent engagement with the teeth on the rod for locking said rod in shifted brake setting position.

11. A control for the ratchet pull rod of a brake setting assembly, comprising a supporting bracket for mounting on the instrument panel of a vehicle and having an opening through which the outer end of the rod extends, a guide frame receiving said rod and fulcrumed at its outer end on said bracket for vertical swing with the rod, clamping tongues on opposite sides of said frame, a spring wire pawl of U shape having the ends of its legs secured to said body at opposite sides thereof by said clamping tongues, said body being transversely slotted for receiving the yoke portion of said pawl for pressure detent engagement with the teeth on the rod for locking said rod in shifted brake setting position, the legs of said pawl between the clamped ends and the yoke portion thereof being bent into spring coils.

12. A control for the ratchet pull bar of a brake setting assembly, comprising a guide frame for the rod, front and rear sets of clamping tongues on opposite sides of said frame, inner and outer spring wire pawls each of U shape, the ends of the legs of the inner pawl being clamped to opposite sides of said frame by said inner clamping tongues and the ends of the outer pawl being clamped to opposite sides of said frame by said outer clamping tongues, said frame having slots into which the yoke portions of the respective pawls extend for pressure detent engagement with the teeth on said rod, said slots being spaced so that upon shift of said rod to brake setting position the yoke portions of said pawls will alternately engage in front of a tooth for locking of the rod in shifted brake setting position.

13. A control for the ratchet pull bar of a brake setting assembly, comprising a guide frame for the rod, front and rear sets of clamping tongues on opposite sides of said frame, inner and outer spring wire pawls each of U shape, the ends of the legs of the inner pawl being clamped to opposite sides of said frame by said inner clamping tongues and the ends of the legs of the outer pawl being clamped to opposite sides of said frame by said outer clamping tongues, said frame having slots into which the yoke portions of the respective pawls extend for pressure detent engagement with the teeth on said rod, said slots being spaced so that upon shift of said rod to brake setting position the yoke portions of said pawls will alternately engage in front of a tooth for locking of the rod in shifted brake setting position, said rod being rotatable in said frame for moving the teeth away from the yoke portions of said pawls for permitting shift of the rod in said frame back to brake release position.

HERBERT S. JANDUS.